(12) United States Patent
Haywood

(10) Patent No.: US 9,712,373 B1
(45) Date of Patent: Jul. 18, 2017

(54) SYSTEM AND METHOD FOR MEMORY ACCESS IN SERVER COMMUNICATIONS

(71) Applicant: Rambus Inc., Sunnyvale, CA (US)

(72) Inventor: Christopher Haywood, Santa Clara, CA (US)

(73) Assignee: Rambus Inc., Sunnyvale, CA (US)

( * ) Notice: Subject to any disclaimer, the term of this patent is extended or adjusted under 35 U.S.C. 154(b) by 322 days.

(21) Appl. No.: 13/797,700

(22) Filed: Mar. 12, 2013

Related U.S. Application Data

(60) Provisional application No. 61/677,077, filed on Jul. 30, 2012.

(51) Int. Cl.
*H04L 29/08* (2006.01)
*G06F 13/40* (2006.01)
*G06F 13/28* (2006.01)
*G06F 13/42* (2006.01)

(52) U.S. Cl.
CPC ........ *H04L 29/08027* (2013.01); *G06F 13/28* (2013.01); *G06F 13/4027* (2013.01); *G06F 13/4282* (2013.01)

(58) Field of Classification Search
CPC ........... H04L 29/08027; H04L 67/1097; G06F 15/161
See application file for complete search history.

(56) References Cited

U.S. PATENT DOCUMENTS

| | | | |
|---|---|---|---|
| 2005/0021847 A1* | 1/2005 | Rothman | G06F 9/5011 709/238 |
| 2005/0089049 A1* | 4/2005 | Chang | H04L 49/101 370/396 |
| 2008/0137284 A1* | 6/2008 | Flynn | G06F 1/183 361/679.32 |
| 2008/0140932 A1* | 6/2008 | Flynn | G06F 1/183 711/114 |
| 2008/0186996 A1* | 8/2008 | Powell et al. | 370/448 |
| 2010/0005218 A1* | 1/2010 | Gower | G06F 13/4234 711/5 |
| 2011/0004729 A1* | 1/2011 | Akkawi et al. | 711/130 |
| 2011/0072204 A1* | 3/2011 | Chang et al. | 711/103 |
| 2011/0317559 A1* | 12/2011 | Kern et al. | 370/235 |
| 2013/0132587 A1* | 5/2013 | Morris | 709/226 |
| 2013/0166672 A1* | 6/2013 | Beukema et al. | 709/215 |

\* cited by examiner

*Primary Examiner* — Chris Parry
*Assistant Examiner* — Caroline Jahnige
(74) *Attorney, Agent, or Firm* — Lowenstein Sandler LLP

(57) ABSTRACT

Embodiments of the present invention are directed to memories used in server applications. More specifically, embodiments of the present invention provide a server that has memory management module that is connected to the processor using one or more DDR channels. The memory management module is configured to provide the processor local access and network access to memories on a network. There are other embodiments as well.

11 Claims, 5 Drawing Sheets

SYSTEM AND METHOD FOR MEMORY ACCESS IN SERVER COMMUNICATIONS

CROSS-REFERENCES TO RELATED APPLICATIONS

This application claims priority to U.S. Provisional Patent Application No. 61/677,077, filed 30 Jul. 2012, entitled "Options for NICless server communications", which is incorporated by reference herein for all purposes.

BACKGROUND OF THE INVENTION

Embodiments of the present invention are directed to memories used in server applications.

Over the last few decades, the use of communication networks exploded. In the early days Internet, popular applications were limited to emails, bulletin board, and mostly informational and text-based web page surfing, and the amount of data transferred was usually relatively small. Today, Internet and mobile applications demand a huge amount of bandwidth for transferring photo, video, music, and other multimedia files. For example, a social network like Facebook processes more than 500 TB of data daily. To process a large amount of information, servers often need to access a large amount of memory and move huge data block amount memory modules.

Unfortunately, existing techniques for utilizing memory in server applications have been inadequate. It is therefore desirable to have new systems and method for memory access in server communications.

BRIEF SUMMARY OF THE INVENTION

Embodiments of the present invention are directed to memories used in server applications. More specifically, embodiments of the present invention provide a server that has memory management module that is connected to the processor using one or more DDR channels. The memory management module is configured to provide the processor local access and network access to memories. There are other embodiments as well.

According to an embodiment, the present provides a server system. The system includes a processor. The system additionally includes a first memory management module coupled to the processor through at least a first DDR channel. The memory management module is configured to access one or more network interfaces using a layer 2 protocol and a first plurality of memory modules. The first memory management module is configured to transfer data blocks from the first plurality of memory modules to the processor. The system also includes a first network interface, which has a plurality of ports. The first network interface is configured to transfer data blocks to a second network interface. The first memory management module uses at least the layer 2 protocol. A second memory management module is configured to access the second network interface using the layer 2 protocol. The second memory management module is configured to receive and transfer the data blocks from the first memory management module to a second plurality of memory modules.

According to another embodiment, the present invention provides a switch module device. The device includes a first network interface that has a plurality of ports. The first network interface is configured to receive data blocks to a second network interface. The device also includes a first memory management module that is configured to receive the data blocks from the first network interface using a layer 2 protocol. The data blocks are generated by a second memory management module of a server and transferred through a second network interface of the server using the layer 2 protocol. Each of the data blocks includes a header section and an error correction section. The first memory management module is configured to transfer the data blocks to a first plurality of memory modules.

According to yet another embodiment, the present invention provides a method for transferring data block from memory modules. The method includes receiving an instruction from a processor through one or more DDR channels. The method also includes processing the instruction. The method further includes accessing a first memory module to retrieve a data block in response to the instruction. The method includes generating a data packet using at least the data block. The data packet includes a header section, a data section, and an error correction section. The method additionally includes transferring the data packet to a first network interface using a layer 2 protocol. Moreover, the method includes sending the data packet to a second network interface of a switching module, which is configured to transfer the data packet to at least a second memory module using the layer 2 protocol.

It is to be appreciated that the embodiments of the present invention provides many advantages over conventional techniques. For example, data block from memory modules of servers are moved by memory management modules, which uses layer 2 data transfer protocols to allow data to be quickly moved from one server to another. In various embodiments, data blocks can be moved from server to server using a Light L2 server to server, where slim-MAC/LLC is embedded in each buffer. For scalability and flexibility, data blocks can be served from a memory blade containing DRAM or Hybrid Flash/DRAM. As additional memories are needed, memory blades and/or hybrid memory can be allocated quickly and flexibly. In addition, spare bandwidth of DDR buses can be metered up to 100G per buffer, thereby increasing the data transfer speed. The flexibility and efficiency of the architecture can provide extremely low latency and minimal payload size penalties. In certain embodiments, memory buffers are provided on board, which gives LRDIMM advantages on DDR channels, capacity, and performance. Additionally, unpopulated channels can be dedicated to server-server traffic. There are other benefits as well.

DETAILED DESCRIPTION OF THE INVENTION

Embodiments of the present invention are directed to memories used in server applications. More specifically, embodiments of the present invention provide a server that has memory management module that is connected to the processor using one or more DDR channels. The memory management module is configured to provide the processor local access and network access to memories on a network. There are other embodiments as well.

Figure 1:
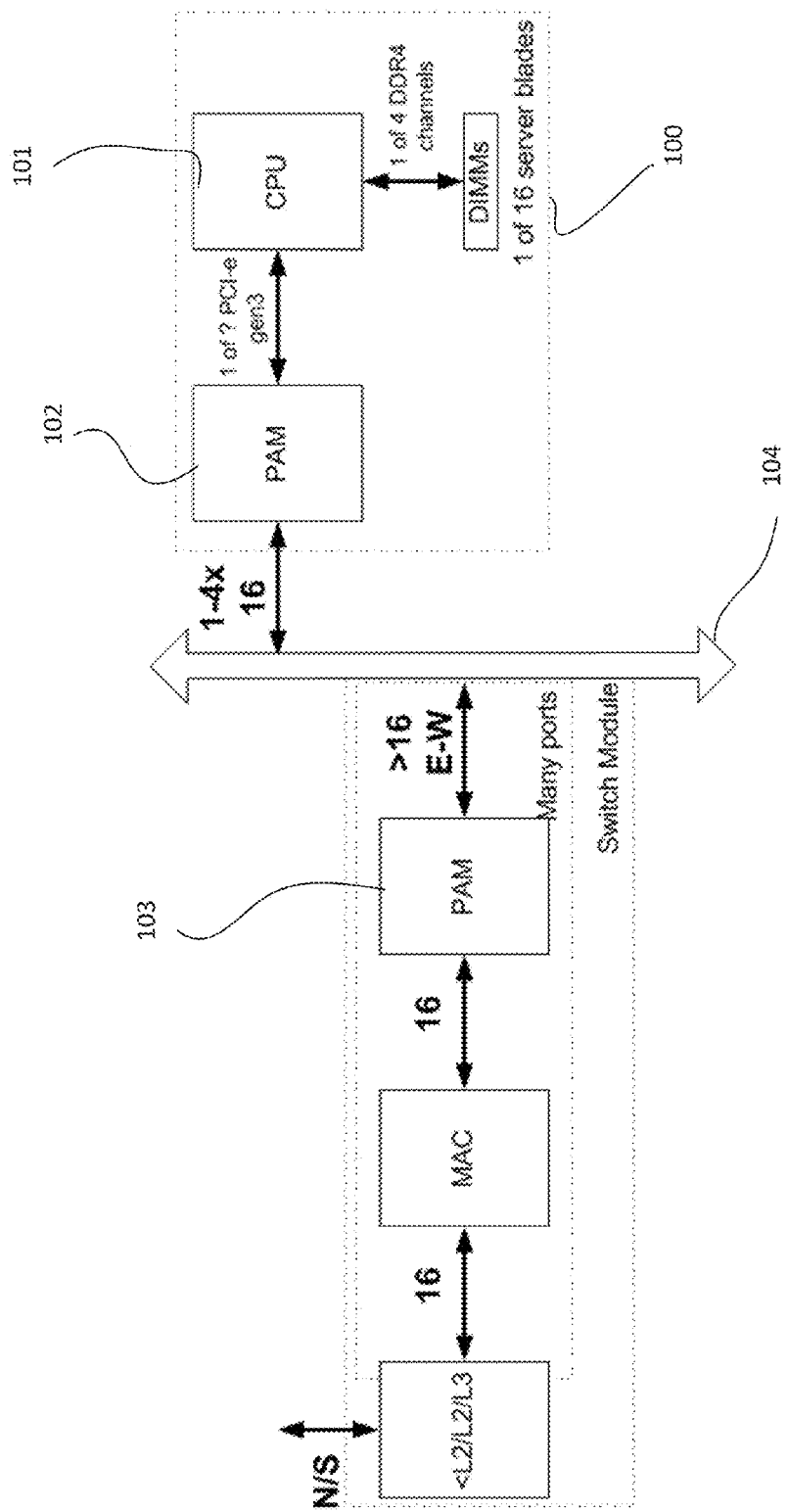
FIG. 1 is a simplified diagram illustrating a conventional server system.

Over the past, servers utilize network interface controllers (NICs) to facilitate transfer of data blocks from one server to another. As an example, FIG. 1 is a simplified diagram illustrating a conventional server system. A server 100 includes a processor 101 and a network interface 102. The server 100 also includes dual in-line memory modules (DIMMs). The processor 101 access memory modules (e.g., DIMMS) direct through one or more double data rate (DDR) channels. For example, the server 100 is a part of blade server array, which requires the server 100 to transfer data blocks to other servers. To transfer data, the processor 101 access network interface 102 a network interface controller. For example, the processor 101 is connected to the network interface 102 through a PCI-e interface. By using third generation X8 PCI-e, a peak bandwidth of about 53 Gbps can be achieved. The network interface 102 is connected to other servers and/or network switches via the network communication interface 103. For example, the network interfaces 102 and 103 may have multiple communication channels. Through the network interface 103, the processor 101 may access other servers and/or devices. The movement of data block may be based on driver models of exiting operating systems.

The type of conventional architecture illustrated in FIG. 1 has many limitations. Among other things, the speed of data transfer is largely based on the bandwidth of pre-assigned hardware communication links. To comply with legacy hardware, it is necessary to carry legal overheads, which translates to reduced efficiency. The bandwidth for moving data block is reduced at small payloads. As the data bus becomes saturated, latency of data transfers increases, thereby reducing performance. In addition, since the conventional architecture (especially legacy hardware) is not designed with network protocols, they are not suitable for application where network-like protocols are used. Bridge to fabric links are needed at each end point, which make switching complex and may require network controller interface.

It is to be appreciated that embodiments of the present invention provide systems and techniques for managing data transfer for server applications.

The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of embodiments. Thus, the present invention is not intended to be limited to the embodiments presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the Claims herein is not intended to invoke the provisions of 35 U.S.C. 112, Paragraph 6.

Please note, if used, the labels left, right, front, back, top, bottom, forward, reverse, clockwise and counter clockwise have been used for convenience purposes only and are not intended to imply any particular fixed direction. Instead, they are used to reflect relative locations and/or directions between various portions of an object.

Figure 2:
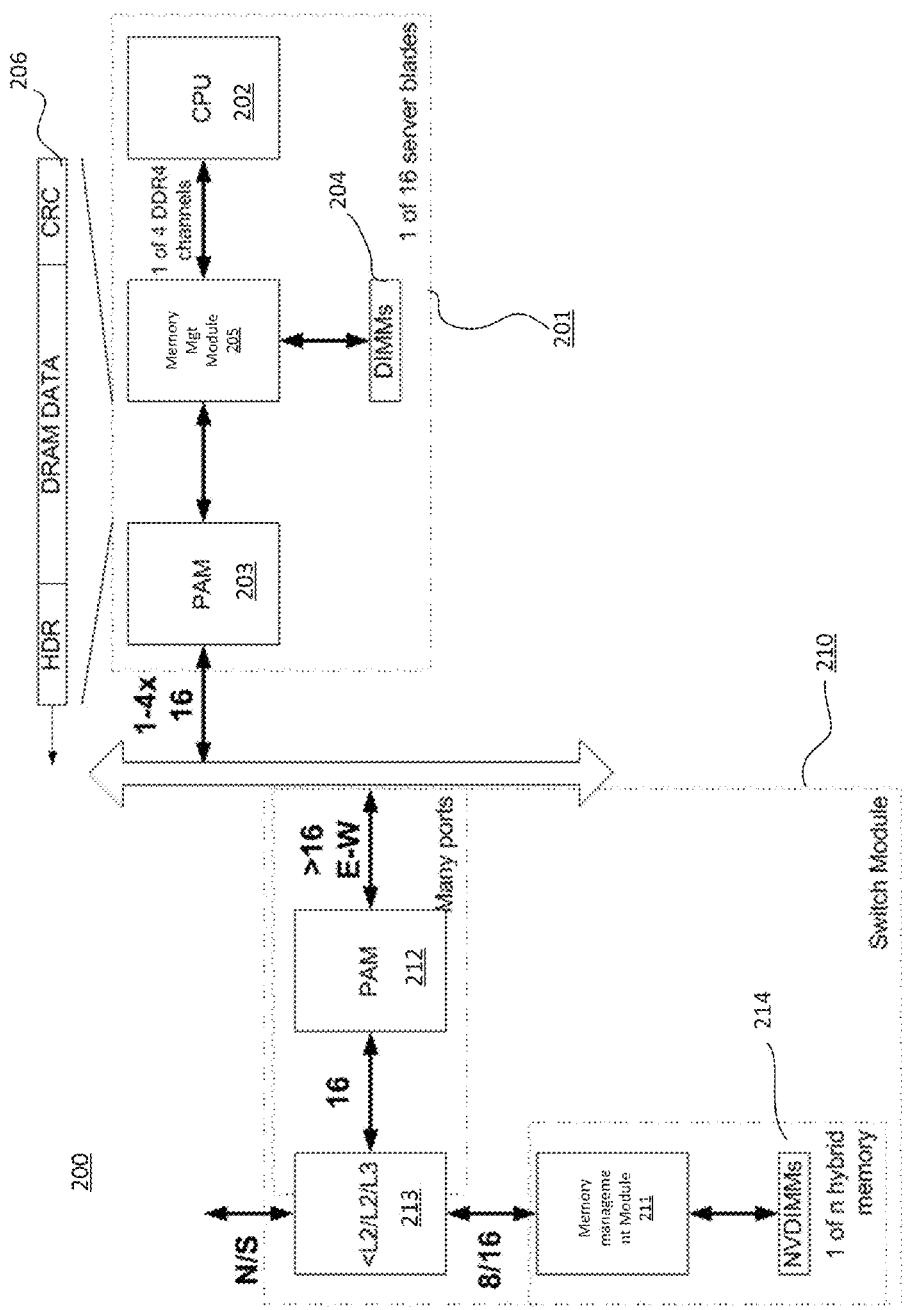
FIG. 2 is a simplified diagram illustrating server architecture 200 according to an embodiment of the present invention.

FIG. 2 is a simplified diagram illustrating server architecture 200 according to an embodiment of the present invention. This diagram is merely an example, which should not unduly limit the scope of the claims. One of ordinary skill in the art would recognize many variations, alternatives, and modifications. The server architecture 200 comprises a switch module 210 and a server 201. For example, the server 210 is a part of a blade server array. The server 202 is connected to a memory management module 205. As shown, the processor 202 is connected to the memory management module 205 using one or more DDR4 channels. DDR4 channels offer high bandwidth for efficient data transfer. It is to be appreciated that other types of data links may be used as well, such as DDR3 or others. In a specific embodiment, the memory management module allocates additional DDR channels and/or other communications for moving data blocks to and from the memory module 204. In certain embodiments, the memory module 204 comprises load reduced DIMM (LRDIMM), which uses a buffer chip (or chips) to replace the register to minimize loading. Among other things, the LRDIMM is used to increase overall server system memory capacity and speed using a memory buffer chip or chips as opposed to a register. The memory management module 205, through its data link to the processor, is configured to transfer data blocks, both from inside (e.g., DIMMs 204) the server 201 and through network interface 203. For example, when a large amount of memory is needed and the DIMMs 204 is insufficient, the memory management module 205 can access addition memory through the switch module 210.

In a specific embodiment, the server 201 is a memory blade server, and the memory modules 204 includes DIMMs and/or flash memory. For example, hybrid memory blades are described in U.S. patent application Ser. No. 13/768,986, filed Feb. 15, 2013, entitled "HYBRID MEMORY BLADE", now granted as U.S. Pat. No. 8,949,473, which is incorporated by reference herein for all purposes. The memory module 204 is accessible to the processor 202 through the memory management module 205.

Figure 3:
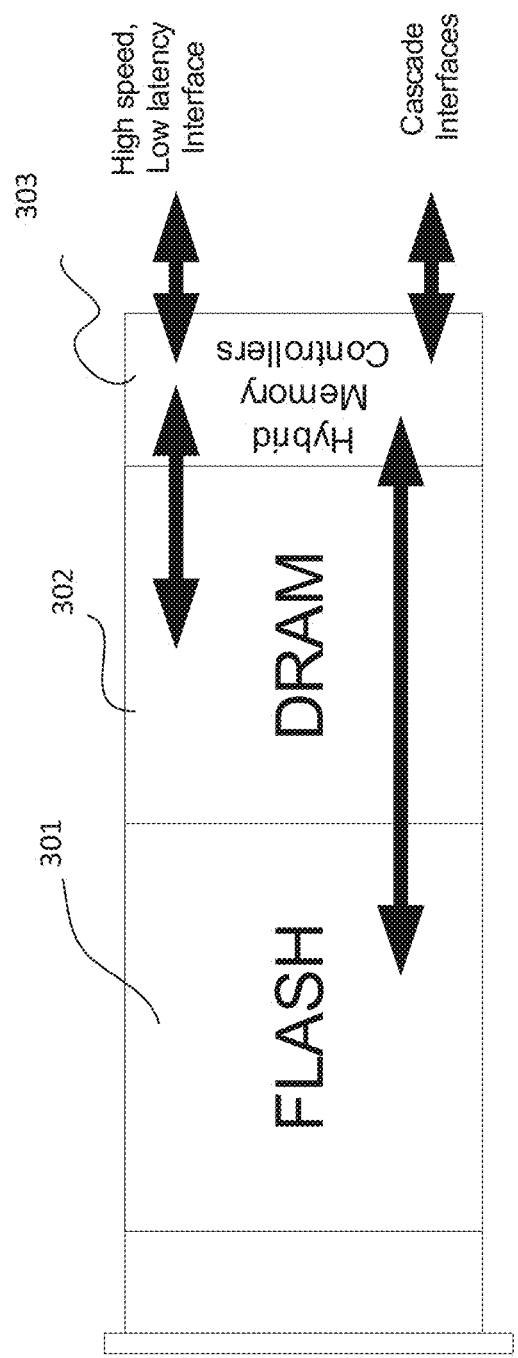
FIG. 3 is a simplified diagram illustrating a hybrid memory module 300 according to an embodiment of the invention.

FIG. 3 is a simplified diagram illustrating a hybrid memory module 300 according to an embodiment of the invention. This diagram is merely an example, which should not unduly limit the scope of the claims. One of ordinary skill in the art would recognize many variations, alternatives, and modifications. In various implementations, the hybrid memory controller 303 is arranged to optimize the use of the different memory types. For example, the memory module 300 comprises flash memory 301 which is used to store slowly changing database information, and DRAM 302 into which FLASH data would be loaded for fast access. The blade may also be arranged such that FLASH data is accessed directly, without first being transferred to DRAM. It is to be appreciated that the use of FLASH memory 301 is advantageous in that it provides a much high data storage density that does DRAM, thereby enabling a given system to employ fewer servers. On the other hand, read and write operations to FLASH memory 301 are much slower than that of DRAM 302. The hybrid memory controller 303 is configured to coordinate the use of the FLASH memory 301 and DRAM 302 to provide the fastest possible data rate. In various embodiments, implementing blade memory is differently than a conventional memory system, where data is stored rather than, for example, files, and with a high speed, low latency interface rather than a conventional I/O structure which can act as a bottleneck to the flow of data. The hybrid memory controller operates with software, which can be customized as needed to optimize the memory blade operation for particular applications and/or for particular memory device types. Today, using RDIMMs, a typical server system can accommodate up to three quad-rank 16 GB RDIMMS per processor. However, that same system can support up to nine As shown in FIG. 3, the hybrid memory controller 303 is coupled to both the DRAM 302 and the FLASH memory 301. It is to be appreciated that FIG. 3 is a simplified block diagram, where there can be a number of flash memory and DRAM modules. Between the DRAM 302 and the controller 303, a high speed and low latency interface is provided. As described below, the controller 303 may also include one or more 'cascade' interfaces, through which it can be coupled to other hybrid memory controllers on the same blade, or coupled to hybrid memory controllers on other blades.

Components of the memory module 200 can be fitted into a single memory blade housing. For example, the memory module is a part of the server 201 in FIG. 2. In various embodiments, the server blade 201 in FIG. 2 complies with form factor of a standard blade server (e.g., c-class server size). For example, a standard 42U server enclosure can fit up to 128 blade server or 128 memory blades. The DRAM 302, for example, can be fitted to ranks of DRAM slots.

Figure 5:
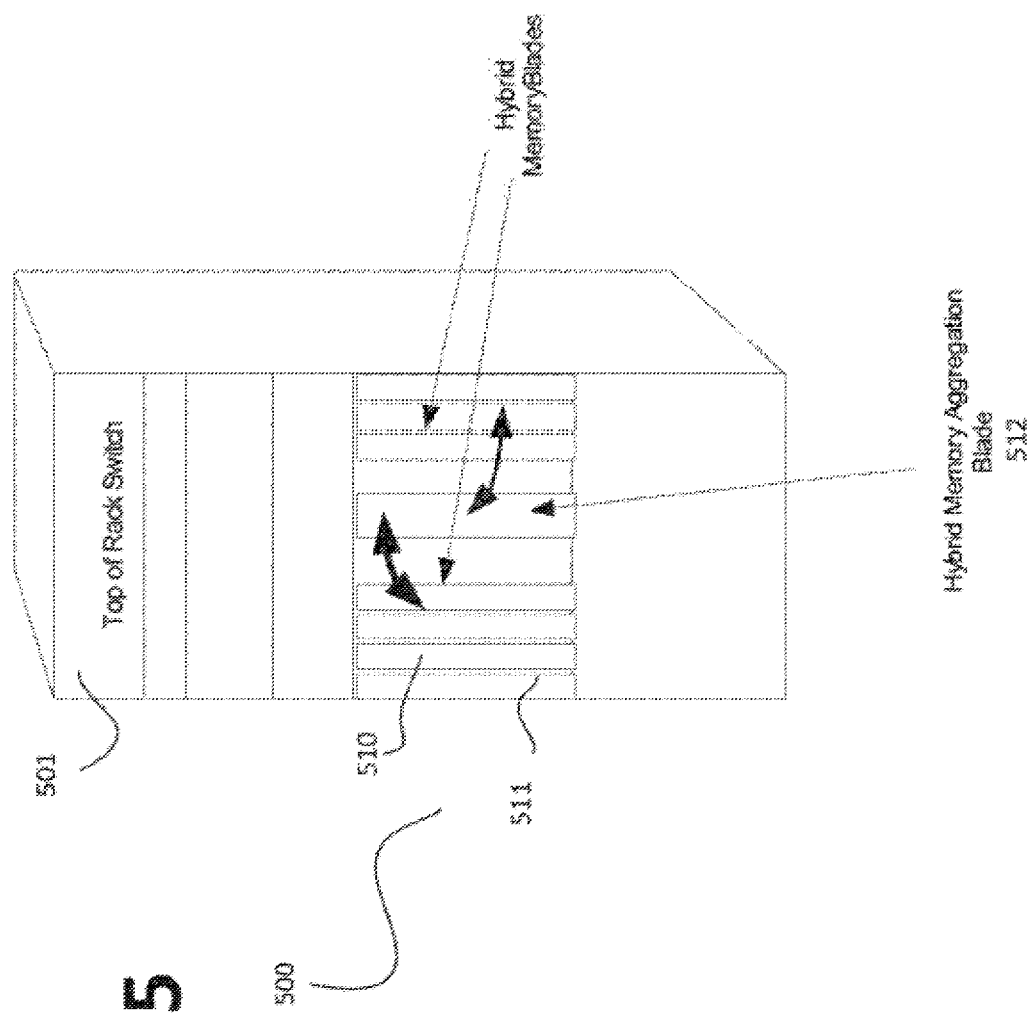
FIG. 5 is a simplified diagram illustrating interconnects of memory blades via an aggregation blade according to an embodiment of the invention.

It is to be appreciated that hybrid memory blades according to embodiments of the present invention are used to expand the computing system memory and storage capacity through high speed, low latency interfaces. For example, the term "memory blade" refers to a blade server as shown in FIG. 2 where a hybrid memory controller is connected to DRAM and flash memory modules, and is further connected to processor and/or other blade servers. Depending on the application, a memory blade according can provide data individually, or together as an aggregated device. For example, aggregation can be accomplished via the chassis, through other blades or top rack switches, or through a "hybrid memory aggregation blade". A hybrid memory aggregation blade can provide an increased parallelism and a reduced latency. FIG. 5 is a simplified diagram illustrating interconnects of memory blades via an aggregation blade according to an embodiment of the invention. This diagram is merely an example, which should not unduly limit the scope of the claims. One of ordinary skill in the art would recognize many variations, alternatives, and modifications. In FIG. 5, the blade server system 500 includes a top of rack switch 501, an aggregation blade 512, and a number of memory blades, including blade 510 and blade 511. The blades 510 and 511 are connected to each through the memory aggregation blade 512. For example, the memory aggregation blade 512 comprises a plurality of high speed interfaces that can facilitate the exchange of data among the blades. In various embodiments, the memory management module 205 is configured to access the memory module through a high-speed and low latency interface, which may be cascaded. For example, the memory management module connects to the hybrid memory controller 303.

Figure 4:
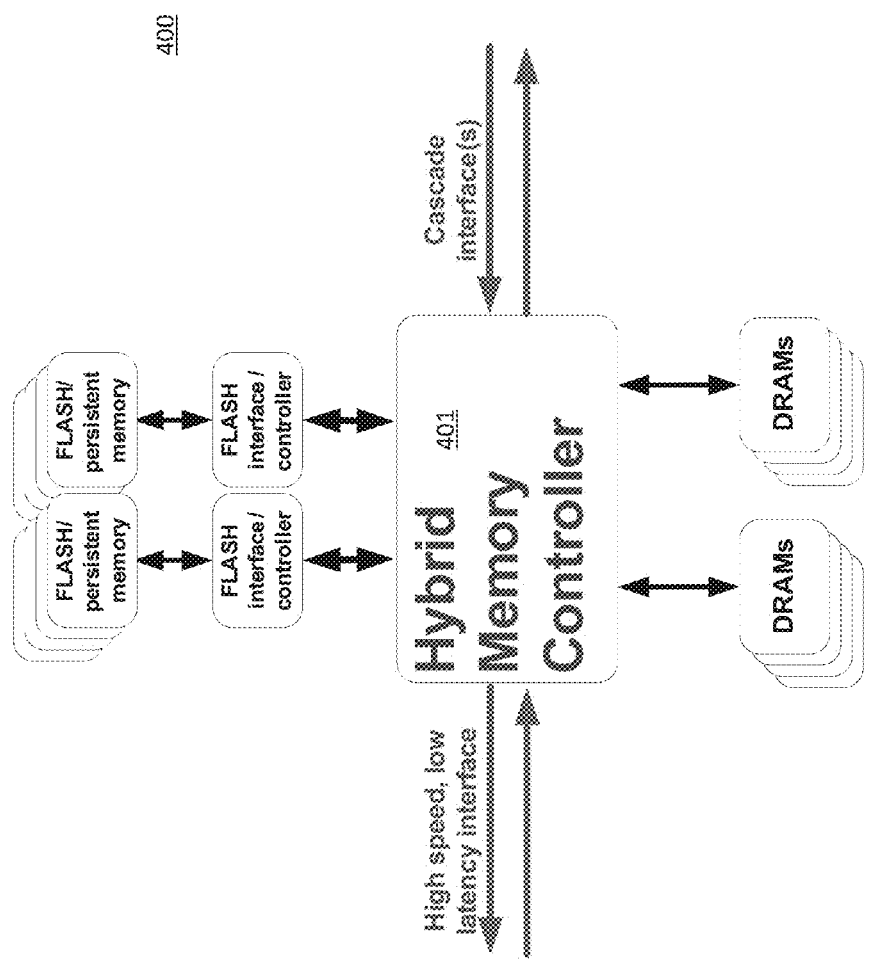
FIG. 4 is a simplified block diagram illustrating a memory module according to an embodiment of the invention.

FIG. 4 is a simplified block diagram illustrating a memory module according to an embodiment of the invention. This diagram is merely an example, which should not unduly limit the scope of the claims. One of ordinary skill in the art would recognize many variations, alternatives, and modifications. As shown in FIG. 4, the memory module 400 includes a hybrid memory controller 401 and DRAMs and non-volatile memory (e.g., FLASH devices). For example, the flash memory (or other types of solid-state memory) modules is connected to the hybrid memory controller via flash interface/controllers. It is to be appreciated that by combining high speed, low latency DRAM and cost effective, non-volatile FLASH memory, a memory module according to embodiments of the present invention creates a hybrid memory/storage system to optimize server system performance, cost, power, and modularity.

A high speed, low latency interface is used to connect the hybrid memory controller 401 of the memory module 400 to one or more processors through the memory management module 205 in FIG. 2. For example, the memory management module 205 is configured to manage high speed connection between the processor 202 and the hybrid memory controller 401. For example, the memory management module 205 can additional provide a cascade interface to allow daisy-chain connection to one or more distributed hybrid memory controllers over the network. In an embodiment, the hybrid memory controller 401 also includes DRAM memory controllers (not shown) and FLASH interface/controllers. As described above, the hybrid memory controller may include intelligent functions to optimize hybrid memory/storage performance. For example, logic functions of the hybrid memory controller may include selecting between DRAM and/or flash memory for various applications, backing up data stored in DRAM into flash memory, and others.

Now referring back to FIG. 2. The memory management module 205 is configured to facilitate access to modules. In an embodiment, the memory management module 205 comprises an integrated circuit that is configured to execute program instructions that is capable of accessing network communication interface. In a specific implementation, the memory management module 205 is configured to use OpenFlow communication protocol to access and utilize the network interface. For example, OpenFlow communication protocol allows the memory management module to access the forwarding plane (or sometimes referred to as the data plane) of network interface and/or network switches over the network. Using the OpenFlow protocol, the memory management module 205 is configured to move data blocks through a path of network switches, where the path is determined by software running on two or more routers. By forwarding data blocks to network elements, the memory management module 205 can efficiently and quickly transfer data blocks for the processor 202. For example, data blocks are routed as data packets among memory modules across the network. As needed, a wide bandwidth (e.g., 100 Gbps)

can be allocated for transferring data blocks from the memory module 204 to other memory modules through the switch module 210.

As shown in FIG. 2, data transferred from the memory management module 205 to the network interface 203 is formatted as data packets. For example, the data packet 205 comprises a header section (HRD), DRAM data (e.g., data block from the memory module 204) section, and error correction (CRC) section. Depending on the specific implementation, additional sections can be added or removed as parts of a data packet.

The network interface 203 is configured to receive data blocks, which include data from the memory module 204, formatted by the memory management module 205 as data blocks. Depending on the application, the network interface 203 may use one or many methods for data communication. In a specific embodiment, pulse amplitude modulation (PAM) format is used to transfer data blocks from the server 201 to the switch module 210. But it is to be understood that other data format are possible as well. As an example, the PAM format is used in conjunction with optical communication links, where high bandwidth is possible. The network interface 203, depending on the amount of data transfer needed, can provide a bandwidth of 100 Gbps or greater. As shown, the network interface 203 comprises a number of channels. For example, the network interface 203 can allocate up to 4 data communication channels for moving data blocks from the server 201 to memory module of another server with minimal delay and high speed.

The switch module 210 includes a network interface 212, which is configured to receive data from the network interface 203 over a data communication network. As described, the network interface 212 may be configured to utilize optical data link to transfer data blocks. The network interface 212 may have a number of ports, and one or more of these ports can be allocated for moving data blocks to and from the memory module 204. In a specific embodiment, the network interface 212 has more than 16 ports for connecting to number of servers, including the server 201. To provide a large number of connections, the switch module 210 and the network interface 212 are configured with a large bandwidth (e.g., over 400 Gbps, and may be greater than 4 Tbps) for moving large amount of data among the servers. For example, the network interface 212 transfers data using PAM format or variants thereof, but it is to be understood that other formats can be used as well.

In various embodiments, the data received by network interface 212 is in the format of data packet 206. For example, the data blocks from the memory module 204 are treated as a network data packet addressable to a memory module at a different server. For example, the data packet is transferred using OpenFlow protocol as described above. Once the data block from the server 201 is received by the network interface 212, the network interface 212 routes the data block to another server as a data packet. As shown in FIG. 2, the switch module comprises a data management module 211. In various embodiments, the data management module 211 is also compatible to OpenFlow protocol, which allows it to receive data blocks from the network interface 212. The memory management module 211 is specifically configured to route data blocks to memory modules 214. For example, the memory module 214 comprises non-volatile (NV) DIMM memory modules. In a specific embodiment, hybrid memory modules as described in FIGS. 3 and 4 are used. Data are moved from the network interface 212 to the memory management module 211 through functional block 213. For example, the block 213 uses L2 (data link layer) and/or L3 (network layer) instructions for moving data from the network interface to the memory modules 214. Depending on the application, the memory management module 211 may have access to a number of hybrid memory modules. For example, the memory management module 211 is configured to allocate memory modules for data as needed.

The memory management module 211 is configured to work with the server 201. For example, if the process 202 requires additional memory, the management module 211 can allocate memory module 214 for processor 202 to use.

It is to be appreciated that the network architecture 200 as illustrated in FIG. 2 provides many advantages over conventional techniques. Among other things, data blocks can be moved from server to server using a Light L2 server to server, where slim-MAC/LLC is embedded in each buffer. For scalability and flexibility, data blocks can be served from a memory blade containing DRAM or Hybrid Flash/DRAM. As additional memories are needed, memory blades and/or hybrid memory can be allocated quickly and flexibly. In addition, spare bandwidth of DDR buses can be metered up to 100G per buffer, thereby increasing the data transfer speed. The flexibility and efficiency of the architecture can provide extremely low latency and minimal payload size penalties. In certain embodiments, memory buffers are provided on board, which gives LRDIMM advantages on DDR channels, capacity, and performance. Additionally, unpopulated channels can be dedicated to server-server traffic.

The exemplary architecture 200 as illustrated in FIG. 2 can be implemented in various ways. In additional to using new servers with this new architecture, existing servers can be upgraded to adopt the new features. For example, server motherboard can be upgraded for to add buffer on board configuration. In addition, data bandwidth of DDR may be configured to be visible on the network and no longer hidden for data sharing.

Depending on the application and specific processors used, scrambling and descrambling data may be needed. In addition, DDR4 bus may be configured to have extensions and/or connector pin-outs for interrupt. In certain embodiments, data caching and virtual memory is provided to allow for data transfer.

While the above is a full description of the specific embodiments, various modifications, alternative constructions and equivalents may be used. Therefore, the above description and illustrations should not be taken as limiting the scope of the present invention which is defined by the appended claims.

What is claimed is:

1. A server system comprising:
    a central processing unit (CPU);
    a first memory management module directly coupled to the CPU through at least a first DDR channel, the first memory management module being configured to access one or more network interfaces using a layer 2 protocol and a first plurality of memory modules, the first memory management module being configured to transfer data blocks from the first plurality of memory modules to the CPU, the first memory management module providing a cascade interface to allow a daisy-chain connection to a hybrid memory controller distributed over a network; and
    a first network interface comprises a plurality of ports, the first network interface being configured to transfer data blocks to a second network interface, the first memory management module using at least the layer 2 protocol, wherein a second memory management module is configured to access the second network interface using the layer 2 protocol, the second memory management module being configured to receive and transfer the data blocks from the first memory management module to a second plurality of memory modules, wherein the first memory management module is configured to access one or more hybrid memory blade servers via a hybrid memory aggregation blade and transfer an aggregated data block from the one or more hybrid memory blade servers to the CPU.

2. The server system of claim 1 wherein the first network interface is configured to access the second network interface via PAM format.

3. The server system of claim 1 wherein the first plurality of memory modules comprises solid-state memory.

4. The server system of claim 1 wherein the second memory management module is configured to send data blocks from the first plurality of memory modules.

5. The server system of claim 1 wherein the first plurality of memory modules comprises load-reduce DIMM memory.

6. The server system of claim 1 the first memory management module is configured to route data blocks from the first plurality of memory modules to the second plurality of memory modules.

7. The server system of claim 1 wherein the first plurality of memory modules comprises DIMM memory chips.

8. The server system of claim 1 wherein the first management module is configured to access a forwarding plane of the first network interface via an OpenFlow protocol.

9. The server system of claim 1 wherein the first network interface comprises pulse amplitude modulation (PAM) interface.

10. The server system of claim 1 wherein the first network interface is configured to allocate communication channels to transfer the data blocks from the first memory management module.

11. The server system of claim 1 wherein the first memory module is configured to allocate communication bandwidth for transferring the data blocks.

* * * * *